US010466554B2

(12) United States Patent
Li et al.

(10) Patent No.: US 10,466,554 B2
(45) Date of Patent: Nov. 5, 2019

(54) CONNECTION WIRING CONFIGURATION FOR AN ARRAY SUBSTRATE, DISPLAY PANEL AND DISPLAY DEVICE

(71) Applicant: BOE TECHNOLOGY GROUP CO., LTD., Beijing (CN)

(72) Inventors: Pan Li, Beijing (CN); Hongfei Cheng, Beijing (CN); Yong Qiao, Beijing (CN); Jianbo Xian, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/566,697

(22) PCT Filed: Apr. 10, 2017

(86) PCT No.: PCT/CN2017/079892
§ 371 (c)(1),
(2) Date: Oct. 13, 2017

(87) PCT Pub. No.: WO2017/177874
PCT Pub. Date: Oct. 19, 2017

(65) Prior Publication Data
US 2018/0203317 A1    Jul. 19, 2018

(30) Foreign Application Priority Data

Apr. 13, 2016 (CN) .................... 2016 2 0307669 U (51) Int. Cl.
*G02F 1/136* (2006.01)
*G02F 1/1362* (2006.01)
(Continued)

(52) U.S. Cl.
CPC ...... *G02F 1/136286* (2013.01); *G02F 1/1345* (2013.01); *G02F 1/1368* (2013.01);
(Continued)

(58) Field of Classification Search
CPC ............ G02F 1/136286; G02F 1/1368; G02F 1/134336; G02F 1/136213;
(Continued)

(56) References Cited

U.S. PATENT DOCUMENTS 5,528,396 A    6/1996 Someya et al.
2010/0033644 A1    2/2010 Hong et al.
(Continued)

FOREIGN PATENT DOCUMENTS

CN    101644863 A    2/2010
CN    202948235 U    5/2013
(Continued)

OTHER PUBLICATIONS

International Search Report and Written Opinion dated Jun. 29, 2017 for corresponding PCT application No. PCT/CN2017/079892.

*Primary Examiner* — Shaun M Campbell
*Assistant Examiner* — Suberr L Chi
(74) *Attorney, Agent, or Firm* — Kinney & Lange, P.A.

(57) ABSTRACT

The present disclosure provides a substrate, a display panel and a display device, for increasing the display viewing angle of the display device, reducing chromatic aberration, and improving product quality. The substrate comprises a plurality of gate lines, a plurality of data lines, and a plurality of common electrode lines extending in a first direction, the plurality of gate lines and the plurality of data lines being arranged to cross one another, a thin film transistor being provided at a crossing position where the gate line and the data line cross each other, a drain electrode of the thin film transistor comprising at least two connection portions each connected with one corresponding pixel electrode, the thin film transistor and the corresponding pixel electrode controlled by the thin film transistor composing a pixel unit, wherein: the plurality of common electrode lines extending
(Continued)

in the first direction are divided into several repeated groups; and the substrate further comprises: a plurality of connection wirings located within a peripheral region of the substrate and extending in a second direction, the plurality of connection wirings extending in the second direction being respectively connected with the ones, having corresponding sequence number, in respective repeated group of the plurality of common electrode lines extending in the first direction.

20 Claims, 5 Drawing Sheets (51) Int. Cl.
G02F 1/1345 (2006.01)
G02F 1/1368 (2006.01)
G02F 1/1343 (2006.01)

(52) U.S. Cl.
CPC .. *G02F 1/134336* (2013.01); *G02F 1/136213* (2013.01); *G02F 2201/121* (2013.01); *G02F 2201/40* (2013.01)

(58) Field of Classification Search
CPC ....... G02F 2001/134318; H01L 27/124; H01L 27/1255
See application file for complete search history.

(56) References Cited

U.S. PATENT DOCUMENTS

2012/0252152 A1    10/2012  Hong et al.
2015/0372015 A1*  12/2015  Cheng ................... H01L 27/124
                                              257/71
2016/0380040 A1*  12/2016  Tada .................... H01L 27/3279
                                              257/72

FOREIGN PATENT DOCUMENTS

CN       103680326 A    3/2014
CN       205563032 U    9/2016
KR       20150073610 A  7/2015

* cited by examiner

CONNECTION WIRING CONFIGURATION FOR AN ARRAY SUBSTRATE, DISPLAY PANEL AND DISPLAY DEVICE

CROSS-REFERENCE TO RELATED APPLICATIONS

The present application claims priority to Chinese Patent Application No. 201620307669.X entitled "SUBSTRATE, DISPLAY PANEL AND DISPLAY DEVICE", filed on Apr. 13, 2016, which is incorporated herein by reference in its entirety.

BACKGROUND

Technical Field

The present disclosure relates to the field of display technologies, and particularly to a substrate, a display panel and a display device.

Description of the Related Art

In a flat display device, a thin film transistor liquid crystal display (TFT-LCD) includes characteristics such as a small volume, no radiation, a relatively lower manufacturing cost and the like and becomes predominant in the current flat display market.

An array substrate of an existing TFT-LCD comprises: a plurality of gate lines, a plurality of data lines, a plurality of common electrode lines extending in a row direction and one connection wiring located in a peripheral region of the substrate and extending in a column direction, the plurality of gate lines and the plurality of data lines are arranged to cross one another, a thin film transistor is provided at a crossing position where the gate line and the data line cross each other, the connection wiring extending in the column direction is connected with a plurality of common electrode lines extending in the row direction, and the common electrode line extending in the row direction and a pixel electrode form a storage capacitor. In prior art, a voltage applied to the pixel electrode is controlled by controlling the TFT, with a lower control precision, resulting in a smaller display viewing angle and a relatively significant chromatic aberration.

SUMMARY

Embodiments of the present application provide a substrate, a display panel and a display device, which may, for example, increase the display viewing angle of the display device, decrease the chromatic aberration and improve product quality.

An embodiment of the present disclosure provides a substrate, comprising a plurality of gate lines, a plurality of data lines, and a plurality of common electrode lines extending in a first direction, the plurality of gate lines and the plurality of data lines being arranged to cross one another, a thin film transistor being provided at a crossing position where the gate line and the data line cross each other, a drain electrode of the thin film transistor comprising at least two connection portions each connected with one corresponding pixel electrode, the thin film transistor and the corresponding pixel electrode controlled by the thin film transistor composing a pixel unit, wherein:

the plurality of common electrode lines extending in the first direction are divided into several repeated groups; and the substrate further comprises: a plurality of connection wirings located within a peripheral region of the substrate and extending in a second direction, the plurality of connection wirings extending in the second direction being respectively connected with the ones, having corresponding sequence number, in respective repeated group of the plurality of common electrode lines extending in the first direction.

Optionally, the common electrode line extending in the first direction and the connection portion of the drain electrode corresponding to the pixel electrode arranged in the first direction form a storage capacitor.

Optionally, the common electrode line extending in the first direction and the pixel electrode arranged in the first direction form a storage capacitor.

Optionally, the drain electrode of the thin film transistor comprises two connection portions, and the pixel electrodes respectively connected with the two connection portions are located at either side of the gate line.

Optionally, a source electrode of the thin film transistor is H-shaped, and the two connection portions extend into two openings of the H-shaped source electrode respectively.

Optionally, each connection portion comprises a crisscross connection land located within an orthographic projection region of the pixel electrode on the substrate and connected with the pixel electrode through a via hole structure.

Optionally, the first direction is a row direction, the second direction is a column direction, and the common electrode line extending in the row direction is located between two adjacent rows of pixel units and forms, together with the connection portions of the drain electrodes corresponding to two adjacent rows of pixel electrodes, storage capacitors.

Optionally, among the plurality of connection wirings extending in the second direction, an absolute value of a voltage difference between any two connection wirings is in a range from 0.1 volts to 0.5 volts.

Optionally, the substrate further comprises: a plurality of common electrode lines extending in the second direction and divided into several repeated groups, each common electrode line extending in the second direction being in a polygonal line shape around the pixel units arranged in the second direction; and a plurality of connection wirings located within the peripheral region of the substrate and extending in the first direction, the plurality of connection wirings extending in the first direction being respectively connected with the ones, having corresponding sequence number, in respective repeated group of the plurality of common electrode lines extending in the second direction.

Optionally, the plurality of connection wirings extending in the second direction are correspondingly connected with the plurality of connection wirings extending in the first direction.

Optionally, two sizes of the pixel electrodes of the pixel units arranged in the first direction are alternately arranged; and/or, two sizes of the pixel electrodes of the pixel units arranged in the second direction are alternately arranged.

Optionally, the first direction is a row direction, the second direction is a column direction, and the number of the common electrode lines extending in the column direction is the same as the number of columns of the pixel units, or the common electrode lines extending in the column direction are arranged to space apart from one another at an interval of at least one column of pixel units.

Optionally, a width of the common electrode line extending in the column direction is larger than a width of the common electrode line extending in the row direction. As such, influence on the voltage of the pixel electrode may be further increased, which is more favorable in achieving fine control of the pixel electrode.

Optionally, among the plurality of connection wirings extending in the first direction, an absolute value of a voltage difference between any two connection wirings is in a range from 0.1 volts to 0.5 volts.

An embodiment of the present disclosure further provides a display panel comprising the substrate described in any preceding technique solution.

An embodiment of the present disclosure further provides a display device comprising the display panel described the preceding technique solution.

DETAILED DESCRIPTION

In order to make objects, technical schemes and advantages of the present disclosure more definite, the present disclosure will be described in detail hereinafter with reference to exemplary embodiments. Embodiments of the present disclosure provide a substrate, a display panel and a display device, which may increase the display viewing angle of the display device, decrease the chromatic aberration and improve product quality.

An embodiment of the present disclosure provides a substrate, comprising a plurality of gate lines, a plurality of data lines, and a plurality of common electrode lines extending in a first direction, the plurality of gate lines and the plurality of data lines being arranged to cross one another, a thin film transistor being provided at a crossing position where the gate line and the data line cross each other, a drain electrode of the thin film transistor comprising at least two connection portions each connected with one corresponding pixel electrode, the thin film transistor and the corresponding pixel electrode controlled by the thin film transistor composing a pixel unit, wherein:

the plurality of common electrode lines extending in the first direction are divided into several repeated groups; and the substrate further comprises: a plurality of connection wirings located within a peripheral region of the substrate and extending in a second direction, the plurality of connection wirings extending in the second direction being respectively connected with the ones, having corresponding sequence number, in respective repeated group of the plurality of common electrode lines extending in the first direction.

With the configuration design of this embodiment, the common electrode lines extending in the first direction in each repeated group may be sequentially supplied with a voltage, such that the voltages of the common electrode lines extending in the first direction are distributed in a periodic cycle on the whole substrate, thereby enabling assisting in adjusting the voltage of the pixel electrode. This design is advantageous in achieving fine control of the pixel electrode, thereby facilitating increase in the display viewing angle of the display device, decrease in the chromatic aberration and improvement in product quality.

Optionally, the common electrode line extending in the first direction and the connection portion of the drain electrode, corresponding to the pixel electrode arranged in the first direction, form a storage capacitor.

Optionally, the common electrode line extending in the first direction and the pixel electrode arranged in the first direction form a storage capacitor.

Optionally, the drain electrode of the thin film transistor comprises two connection portions, and the pixel electrodes respectively connected with the two connection portions are located at either side of the gate line.

Optionally, the source electrode of the thin film transistor is H-shaped, and the two connection portions extend into two openings of the H-shaped source electrode respectively.

Optionally, each connection portion comprises a crisscross connection land located within an orthographic projection region of the pixel electrode on the substrate and connected with the pixel electrode through a via hole structure.

Optionally, the first direction is a row direction, the second direction is a column direction, and the common electrode line extending in the row direction is located between two adjacent rows of pixel units and forms, together with the connection portions of the drain electrodes corresponding to two adjacent rows of pixel electrodes, storage capacitors.

This embodiment reduces the number of the common electrode lines extending in the row direction, simplifies a structure and can also enable assisting in adjusting the voltage of the pixel electrode, which is advantageous in achieving fine control of the pixel electrode, thereby facilitating increase in the display viewing angle of the display device, decrease in the chromatic aberration and improvement in product quality.

Optionally, among the plurality of connection wirings extending in the second direction, an absolute value of a voltage difference between any two connection wirings is in a range from 0.1 volts to 0.5 volts.

Optionally, the substrate further comprises: a plurality of common electrode lines extending in the second direction and divided into several repeated groups, each common electrode line extending in the second direction being in a polygonal line shape around the pixel units arranged in the second direction; and a plurality of connection wirings located within the peripheral region of the substrate and extending in the first direction, the plurality of connection wirings extending in the first direction being respectively connected with the ones, having corresponding sequence number, in respective repeated group of the plurality of common electrode lines extending in the second direction.

Influence on the voltage of the pixel electrode may be increased by provision of the common electrode line extending in the second direction, which is more favorable in achieving fine control of the pixel electrode.

Optionally, the plurality of connection wirings extending in the second direction are correspondingly connected with the plurality of connection wirings extending in the first direction. This may simplify line arrangement in the peripheral region of the substrate, thereby facilitating design in narrow bezel.

Optionally, two sizes of the pixel electrodes of the pixel units arranged in the first direction are respectively alternately arranged; and/or, two sizes of the pixel electrodes of the pixel units arranged in the second direction are respectively alternately arranged. With this design, influence on the voltage of the pixel electrode may be increased by the common electrode line extending in the row direction and the common electrode line extending in the column direction, which is more advantageous in achieving fine control of the pixel electrode.

Optionally, when the first direction is a row direction and the second direction is a column direction, the number of the common electrode lines extending in the column direction is the same as the number of columns of the pixel units, or the common electrode lines extending in the column direction are arranged to space apart from one another at an interval of at least one column of pixel units.

Optionally, a width of the common electrode line extending in the column direction is larger than a width of the common electrode line extending in the row direction. As such, influence on the voltage of the pixel electrode may be further increased so as to achieve fine control of the pixel electrode.

Optionally, among the plurality of connection wirings extending in the first direction, an absolute value of a voltage difference between any two connection wirings is in a range from 0.1 volts to 0.5 volts.

Figure 1:
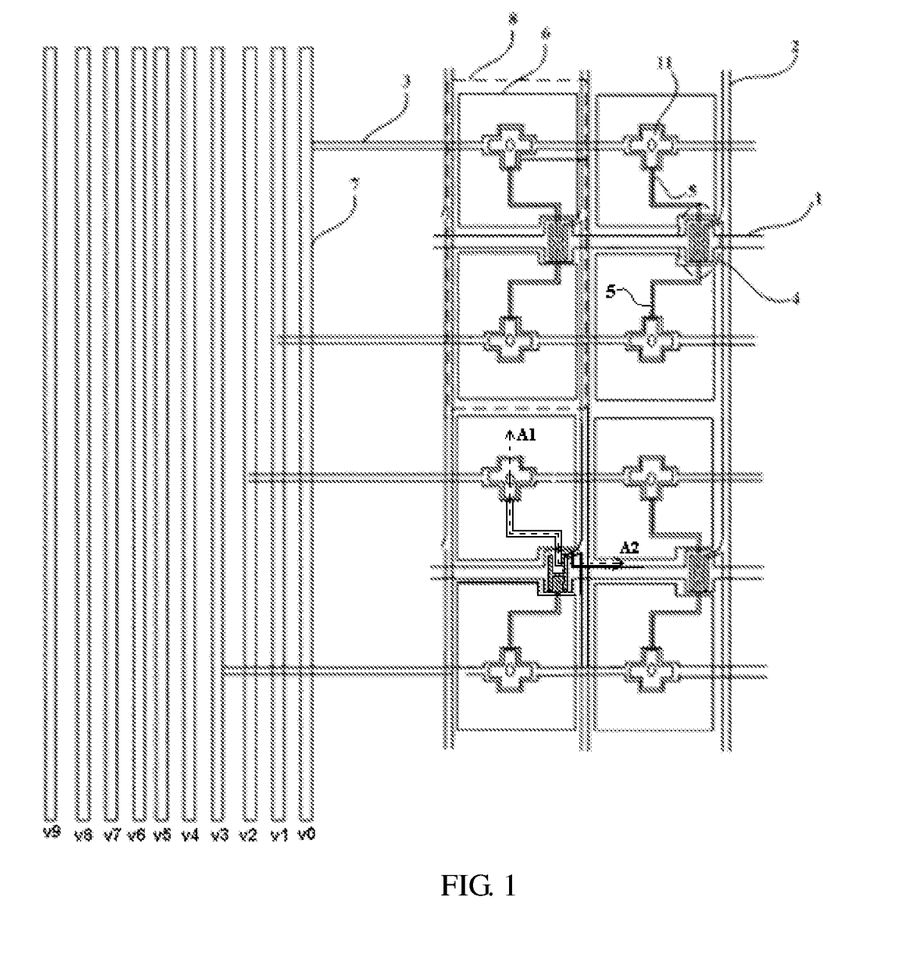
FIG. 1 is a top view of an array substrate according to an embodiment of the present disclosure.

As shown FIG. 1, an embodiment of the present disclosure provides a substrate, comprising a plurality of gate lines 1, a plurality of data lines 2, and a plurality of common electrode lines 3 extending in a row direction, the plurality of gate lines 1 and the plurality of data lines 2 are arranged to cross one another, a thin film transistor 4 is provided at a crossing position between the gate line 1 and the data line 2, a drain electrode of the thin film transistor 4 comprises at least two connection portions 5 each connected with one corresponding pixel electrode 6, pixel electrodes 6 are arranged in an array on the substrate, the common electrode line 3 extending in the first direction and the connection portion 5 of the drain electrode corresponding to the pixel electrode 6 arranged in the first direction form a storage capacitor, and the thin film transistor 4 and the corresponding pixel electrode 6 controlled by the thin film transistor composing a pixel unit; wherein:

the plurality of common electrode lines 3 extending in the first direction are divided into several repeated groups; and the substrate further comprises: a plurality of connection wirings 7 located within a peripheral region of the substrate and extending in a second direction, the plurality of connection wirings 7 extending in the second direction are connected to a driver circuit and are respectively connected with the ones, having corresponding sequence number, in respective repeated group of the plurality of common electrode lines 3 extending in the first direction.

In this embodiment, the drain electrode of the thin film transistor 4 comprises two connection portions 5, and the pixel electrodes 6 respectively connected with the two connection portions 5 are located at either side of the gate line 1, that is, one thin film transistor 4 controls two corresponding pixel electrodes 6. Specifically, the drain electrode of the thin film transistor 4 is H-shaped, and the two connection portions 5 of the drain electrode extend into two openings of the H-shaped source electrode respectively; each connection portion 5 comprises a crisscross connection land 11 located within an orthographic projection region of the pixel electrode 6 on the substrate and connected with the pixel electrode 6 through a via hole structure.

Figure 6:
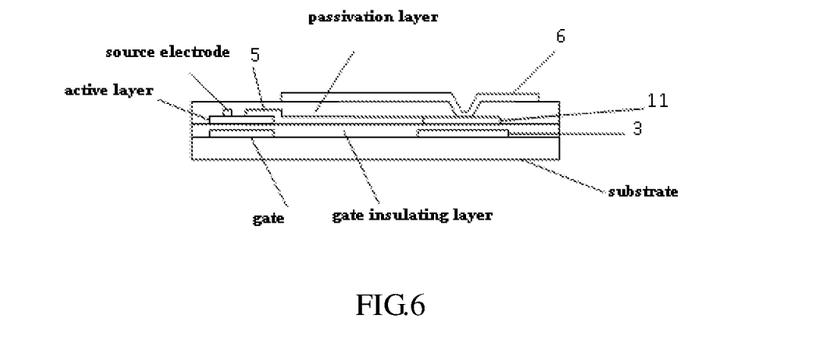
FIG. 6 is a cross-sectional view, along line A1-A2 in FIG. 1, of an array substrate according to an embodiment of the present disclosure

FIG. 6 is a cross sectional view, along line A1-A2 in FIG. 1, of an array substrate according to an embodiment of the present disclosure. In FIG. 6, the pixel electrode 6, the connection portion 5, the crisscross connection land 11 and the common electrode line 3 are illustrated. Also, a source electrode, an active layer, a gate, a gate insulating layer and a passivation layer are illustrated in FIG. 6, which are known to exist in a thin-film transistor and connection structure configuration, to assist understanding the structure of the array substrate.

As shown FIG. 1, in this embodiment, each repeated group comprises ten common electrode lines 3 (only some thereof is illustrated in figure) extending in the row direction, and ten connection wirings 7 extending in the column direction provide voltages V0 to V9 to the top-down ten common electrode lines extending in the row direction in each repeated group. Among the ten connection wirings 7 extending in the column direction, an absolute value of a voltage difference between any two connection wirings 7 extending in the column direction is 0.1 volts to 0.5 volts.

With the configuration design of this embodiment, the common electrode lines extending in the first direction in each repeated group may be sequentially supplied with a voltage, such that the voltages of the common electrode lines extending in the first direction are distributed in a periodic cycle on the whole substrate, thereby enabling assisting in adjusting the voltage of the pixel electrode. This design is advantageous in achieving fine control of the pixel electrode, thereby facilitating increase in the display viewing angle of the display device, decrease in the chromatic aberration and improvement in product quality.

Figure 2:
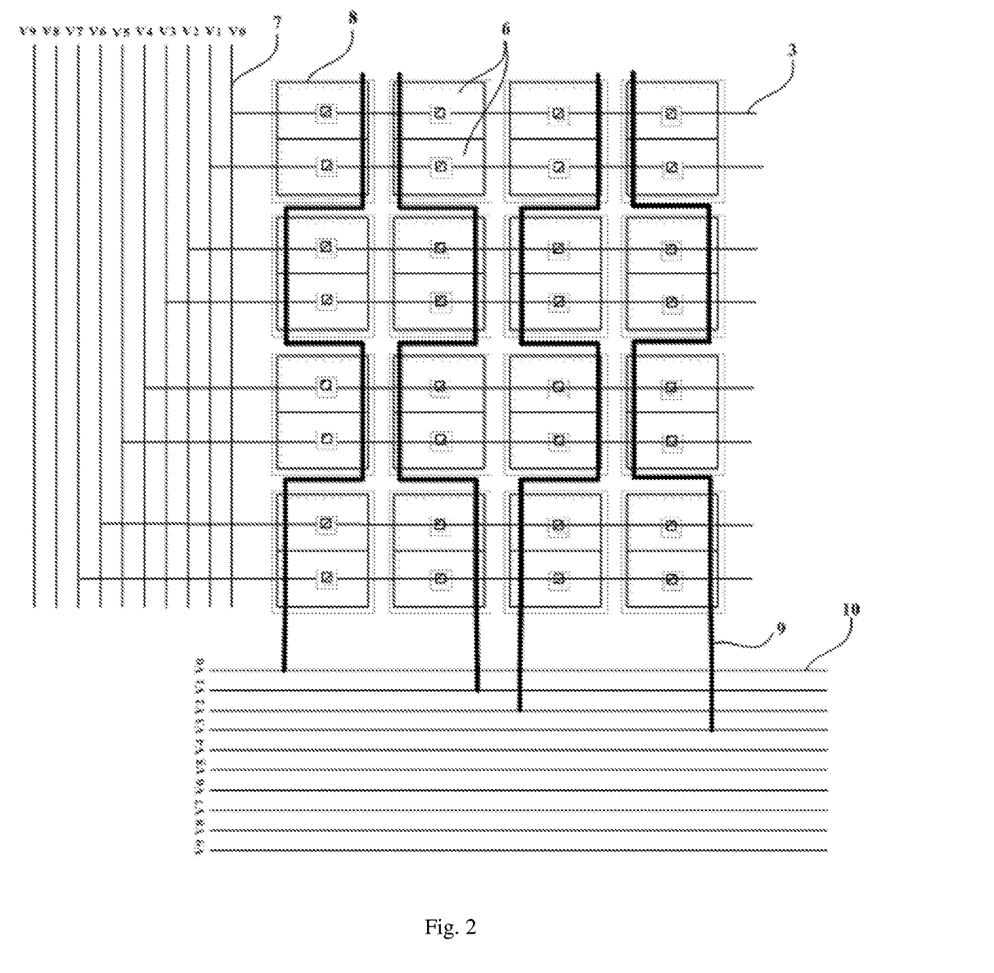
FIG. 2 is a top view of an array substrate according to an embodiment of the present disclosure.

FIG. 2 shows another embodiment of the present disclosure. In this embodiment, in addition to the parts of the substrate in the embodiment shown in FIG. 1, the substrate of this embodiment further comprises:

a plurality of common electrode lines 9 extending in the column direction and divided into several repeated groups according to a set voltage repeated period, each common electrode line 9 extending in the second direction being in a polygonal line shape around the pixel units 8 arranged in the column direction, the number of the common electrode lines 9 extending in the column direction is the same as the number of columns of the pixel units 8; and a plurality of connection wirings 10 located within the peripheral region of the substrate (the connection wirings may be located on an upper or lower side of the substrate, and FIG. 2 shows a case where the connection wirings are located on the lower side of the substrate) and extending in the row direction, the plurality of connection wirings 10 extending in the row direction being connected to a driver circuit and respectively connected with the ones, having corresponding sequence number, in respective repeated group of the plurality of common electrode lines 9 extending in the column direction.

It is noted that the plurality of common electrode lines 9 extending in the column direction may be also arranged to space apart from one another at an interval of one column of pixel units, or at an interval of two columns of pixel units, or at an interval of more columns of pixel units, and the specific arrangement is not limited. FIG. 2 only shows one arrangement.

In this embodiment, each repeated group of common electrode lines 9 extending in the column direction comprises ten common electrode lines extending in the column direction, and ten connection wirings 10 extending in the row direction provide voltages V0 to V9 to the left-right ten common electrode lines extending in the column direction in each repeated group. Among the ten connection wirings 10 extending in the row direction, an absolute value of a voltage difference between any two connection wirings 10 extending in the row direction is 0.1 volts to 0.5 volts.

The common electrode line 9 extending in the column direction is designed into a polygonal line shape, which may increase influence on the voltage of the pixel electrode and is more favorable in achieving fine control of the pixel electrode.

Optionally, a width of the common electrode line 9 extending in the column direction is larger than a width of the common electrode line 3 extending in the row direction. As such, influence on the voltage of the pixel electrode may be further increased, which is more favorable in achieving fine control of the pixel electrode.

Figure 3:
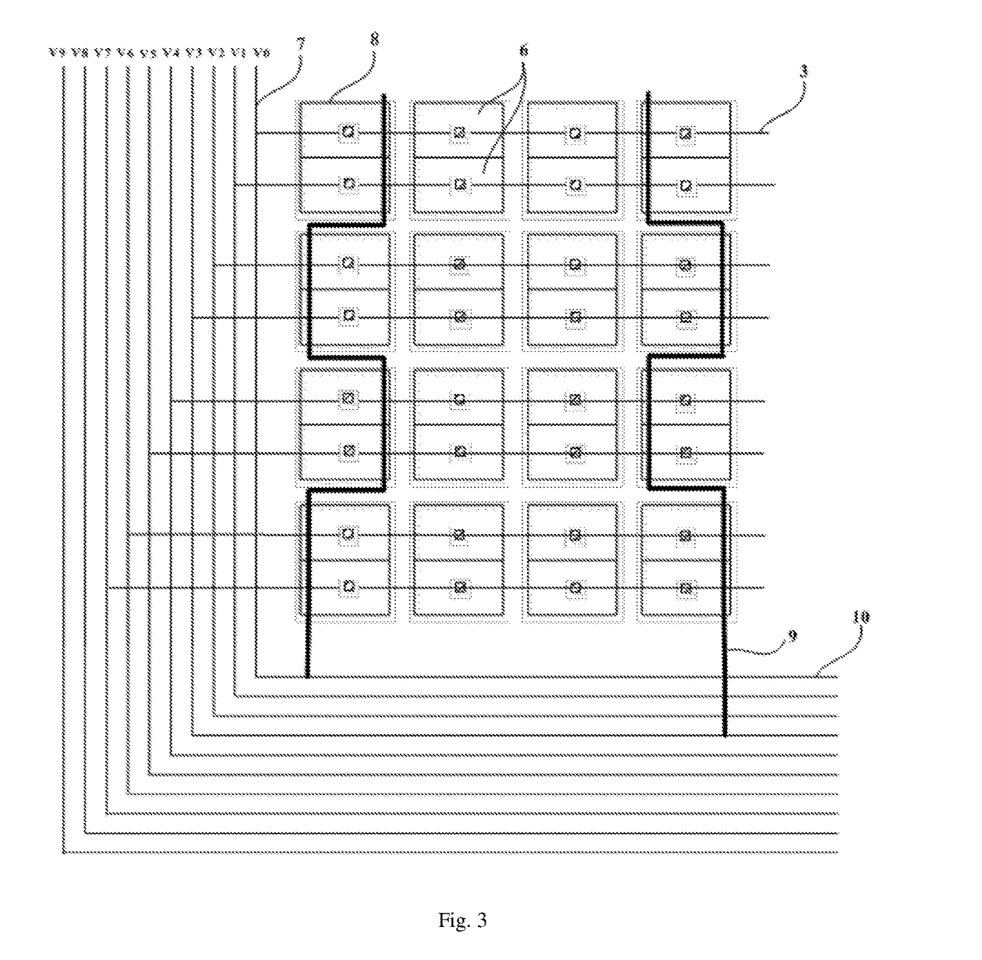
FIG. 3 is a top view of an array substrate according to an embodiment of the present disclosure.

FIG. 3 shows a further embodiment of the present disclosure. This embodiment differs from the embodiment shown in FIG. 2 in that the common electrode lines 9 extending in the column direction are arranged to space apart from one another at an interval of two columns of pixel units. Further, the plurality of connection wirings 7 extending in the column direction are correspondingly connected with the plurality of connection wirings 10 extending in the row direction.

It can be seen from FIG. 3 that, after the plurality of connection wirings 7 extending in the column direction are correspondingly connected with the plurality of connection wirings 10 extending in the row direction, they may be connected to a same one driver circuit, which may simplify line arrangement in the peripheral region of the substrate, thereby facilitating design in narrow bezel.

Figure 4:
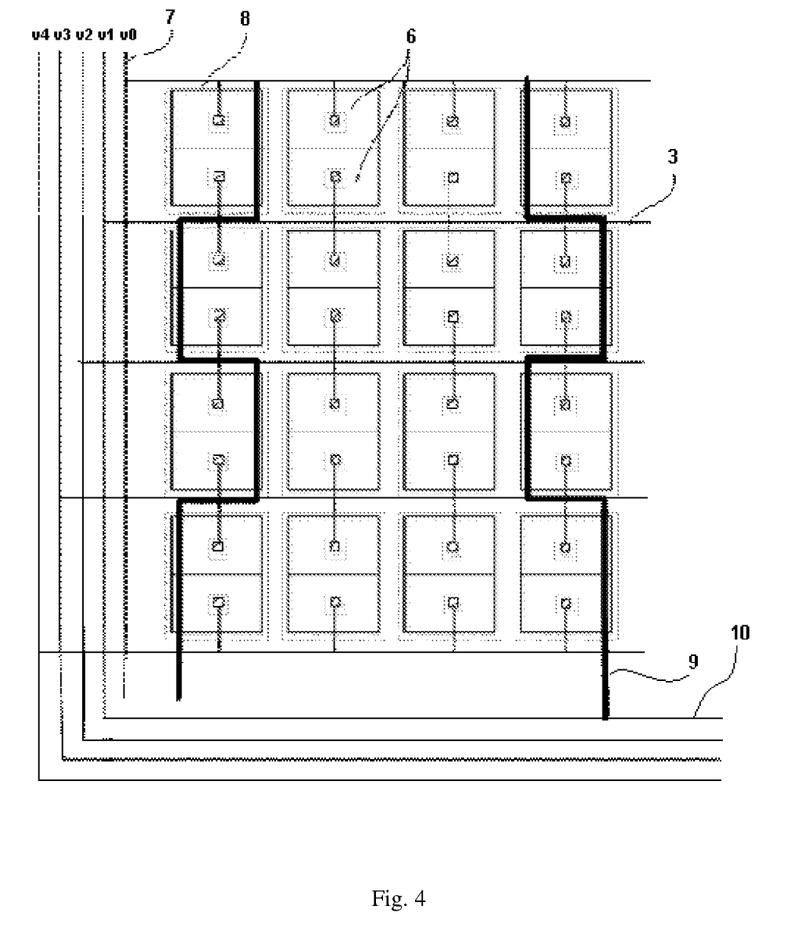
FIG. 4 is a top view of an array substrate according to an embodiment of the present disclosure.

FIG. 4 shows a still further embodiment of the present disclosure. This embodiment differs from the embodiment shown in FIG. 3 in that in this embodiment, the common electrode line 3 extending in the row direction is located between two adjacent rows of pixel units 8 and forms, together with the connection portions of the drain electrodes corresponding to two adjacent rows of pixel electrodes 6, storage capacitors.

This embodiment reduces the number of the common electrode lines 3 extending in the row direction and simplifies a structure. It can be seen from the figure that there are illustrated five connection wirings 7 extending in the column direction and five connection wirings 10 extending in the row direction which are correspondingly connected with each other, causing a reduction by half in number compared to the third embodiment. Further, it also enables assisting in adjusting the voltage of the pixel electrode and is advantageous in achieving fine control of the pixel electrode, thereby facilitating increase in the display viewing angle of the display device, decrease in the chromatic aberration and improvement in product quality.

Figure 5:
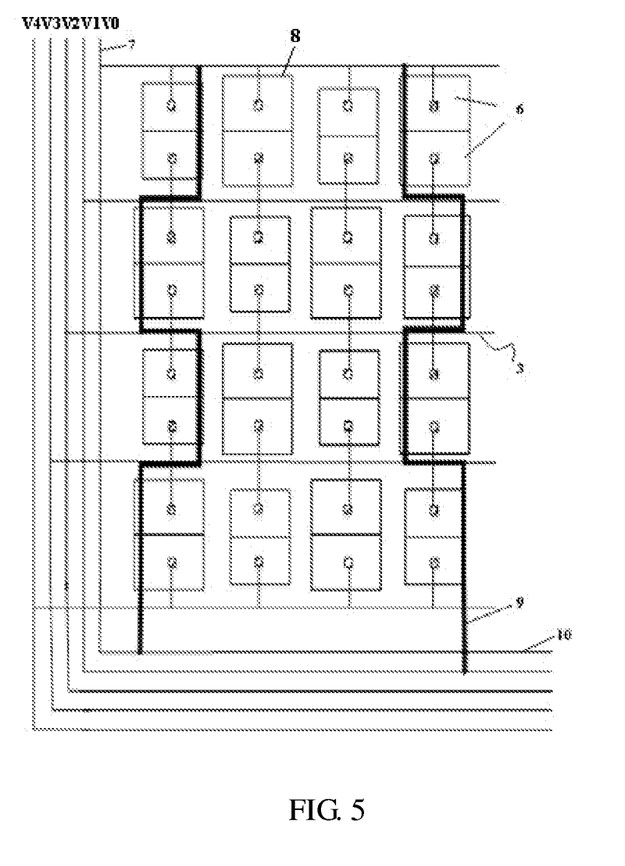
FIG. 5 is a top view of an array substrate according to an embodiment of the present disclosure.

FIG. 5 shows an embodiment of the present disclosure. This embodiment differs from the embodiment shown in FIG. 4 in that in this embodiment, sizes of the pixel electrodes of the pixel units arranged in the row direction are alternately arranged; and/or, sizes of the pixel electrodes of the pixel units arranged in the column direction are alternately arranged. With this design, influence on the voltage of the pixel electrode may be further increased, thereby being more favorable in achieving fine control of the pixel electrode.

An embodiment of the present disclosure further provides a display panel, comprising the substrate in any above-described technique solutions. Compared to prior arts, this display panel has an increased display viewing angle, a reduced chromatic aberration and improved product quality.

An embodiment of the present disclosure further provides a display device, comprising the display panel described in the above technique solution. Compared to prior arts, this display device has an increased display viewing angle, a reduced chromatic aberration and improved product quality. Specific type of the display device is not limited, for example, it may be liquid crystal TV, a liquid crystal display, a tablet computer, a mobile phone or the like.

In the present disclosure, terms "first", "second" and the like are only used for indicating different directions or parts, and are not intended to represent primary or secondary importance or sequence. Various embodiments of the present disclosure only provide some, rather than all, of implementations of the present disclosure, and those skilled in the art can obtain other implementations according to the provided embodiments. For example, the connection wirings may be arranged at either side or on more sides of the peripheral region of the substrate, and the common electrode lines may be also arranged in other ways.

Obviously, various changes or modifications may be made to the present disclosure by those skilled in the art without departing from the principles and spirit of the disclosure. Thus, if these changes or modifications of the present disclosure belong to scopes of claims and equivalents thereof of the present disclosure, these changes or modifications are also intended to be included in the present disclosure.

What is claimed is:

1. An array substrate, comprising:
a plurality of gate lines,
a plurality of data lines,
a plurality of common electrode lines, the plurality of common electrode lines extending in a first direction, the plurality of gate lines and the plurality of data lines being arranged to cross one another,
a thin film transistor provided at a crossing position where each of the plurality of gate lines and each of the plurality of data lines cross each other, wherein a drain electrode of the thin film transistor comprises two connection portions each connected with a corresponding pixel electrode, and the thin film transistor and the corresponding pixel electrode controlled by the thin film transistor constitute a pixel unit, wherein:
the plurality of common electrode lines extending in the first direction are divided into several repeated groups; and
the array substrate further comprises: a plurality of connection wirings located within a peripheral region of the substrate and extending in a second direction, the plurality of connection wirings extending in the second direction being respectively connected with the common electrode lines, having corresponding sequence numbers, in a respective repeated group of the plurality of common electrode lines extending in the first direction.

2. The array substrate according to claim 1, wherein, a plurality of respective common electrode lines extending in the first direction and connection portion of the drain electrode corresponding to the pixel electrode arranged in the first direction form a storage capacitor.

3. The array substrate according to claim 1, wherein, a respective common electrode line extending in the first direction and pixel electrode arranged in the first direction form a storage capacitor.

4. The array substrate according to claim 1, wherein, the drain electrode of the thin film transistor comprises two connection portions, and the pixel electrodes respectively connected with the two connection portions are located at either side of the gate line.

5. The array substrate according to claim 4, wherein, a source electrode of the thin film transistor is H-shaped, and the two connection portions extend into two openings of the H-shaped source electrode respectively.

6. The array substrate according to claim 4, wherein, each of the connection portions comprises a crisscross connection land located within an orthographic projection region of the pixel electrode on the substrate and connected with the pixel electrode through a via hole structure.

7. The array substrate according to claim 1, wherein, the first direction is a row direction, the second direction is a column direction, and a respective common electrode line extending in the row direction is located between two adjacent rows of pixel units and forms, together with the connection portions of the drain electrodes corresponding to two adjacent rows of pixel electrodes, storage capacitors.

8. The array substrate according to claim 1, wherein, among the plurality of connection wirings extending in the second direction, an absolute value of a voltage difference between any two connection wirings is in a range from 0.1 volts to 0.5 volts.

9. The array substrate according to claim 1, wherein, the substrate further comprises:
a plurality of common electrode lines extending in the second direction and divided into several repeated groups, each of the plurality of common electrode lines extending in the second direction being in zigzag line shape around the pixel units arranged in the second direction; and
a plurality of connection wirings located within a peripheral region of the substrate and extending in the first direction, the plurality of connection wirings extending in the first direction being respectively connected with the plurality of common electrode lines, having corresponding sequence numbers, in a respective repeated group of the plurality of common electrode lines extending in the second direction.

10. The array substrate according to claim 9, wherein, the plurality of connection wirings extending in the second direction are correspondingly connected with the plurality of connection wirings extending in the first direction.

11. The array substrate according to claim 9, wherein, the pixel electrodes of the pixel units arranged in the first direction are alternately arranged to have a first size and a second size, different from the first size; and/or, the pixel electrodes of the pixel units arranged in the second direction are alternately arranged to have a third size and a fourth size, different from the third size.

12. The array substrate according to claim 9, wherein, the first direction is a row direction, the second direction is a column direction, and:
a number of the plurality of common electrode lines extending in the column direction is the same as a number of columns of the pixel units, or
the plurality of common electrode lines extending in the column direction are arranged to space apart from one another at an interval of at least one column of pixel units.

13. The array substrate according to claim 12, wherein, a width of the common electrode lines extending in the column direction is larger than a width of the common electrode lines extending in the row direction.

14. The array substrate according to claim 9, wherein, among the plurality of connection wirings extending in the first direction, an absolute value of a voltage difference between any two connection wirings is 0.1 volts to 0.5 volts.

15. A display panel, comprising the substrate of claim 1.

16. A display device, comprising the display panel according to claim 15.

17. The array substrate according to claim 2, wherein, the substrate further comprises:
a plurality of common electrode lines extending in the second direction and divided into several repeated groups, each of the plurality of common electrode lines extending in the second direction being in zigzag line shape around the pixel units arranged in the second direction; and
a plurality of connection wirings located within a peripheral region of the substrate and extending in the first direction, the plurality of connection wirings extending in the first direction being respectively connected with the plurality of common electrode lines, having corresponding sequence numbers, in a respective repeated group of the plurality of common electrode lines extending in the second direction.

18. The array substrate according to claim 3, wherein, the substrate further comprises:
a plurality of common electrode lines extending in the second direction and divided into several repeated groups, each of the plurality of common electrode lines extending in the second direction being in zigzag line shape around the pixel units arranged in the second direction; and
a plurality of connection wirings located within a peripheral region of the substrate and extending in the first direction, the plurality of connection wirings extending in the first direction being respectively connected with the plurality of common electrode lines, having corresponding sequence numbers, in a respective repeated group of the plurality of common electrode lines extending in the second direction.

19. The array substrate according to claim 4, wherein, the substrate further comprises:
a plurality of common electrode lines extending in the second direction and divided into several repeated groups, each of the plurality of common electrode lines extending in the second direction being in a zigzag line shape around the pixel units arranged in the second direction; and
a plurality of connection wirings located within a peripheral region of the substrate and extending in the first direction, the plurality of connection wirings extending in the first direction being respectively connected with the plurality of common electrode lines, having corresponding sequence numbers, in a respective repeated group of the plurality of common electrode lines extending in the second direction.

20. The array substrate according to claim 7, wherein, the substrate further comprises:
a plurality of common electrode lines extending in the second direction and divided into several repeated groups, each of the plurality of common electrode lines extending in the second direction being in a zigzag line shape around the pixel units arranged in the second direction; and
a plurality of connection wirings located within a peripheral region of the substrate and extending in the first direction, the plurality of connection wirings extending in the first direction being respectively connected with the plurality of common electrode lines, having corresponding sequence numbers, in a respective repeated group of the plurality of common electrode lines extending in the second direction.

* * * * *